(12) United States Patent
Tang et al.

(10) Patent No.: US 8,548,237 B2
(45) Date of Patent: Oct. 1, 2013

(54) ORDINAL AND SPATIAL LOCAL FEATURE VECTOR BASED IMAGE REPRESENTATION

(75) Inventors: Feng Tang, Mountain View, CA (US); Suk Hwan Lim, Mountain View, CA (US); Nelson Liang An Chang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 431 days.

(21) Appl. No.: 12/906,831

(22) Filed: Oct. 18, 2010

(65) Prior Publication Data

US 2012/0093408 A1    Apr. 19, 2012

(51) Int. Cl.
*G06K 9/00*    (2006.01)
(52) U.S. Cl.
USPC .......................................... 382/168; 382/170
(58) Field of Classification Search
USPC ................. 382/168, 170, 171, 172, 173, 103, 382/107, 190–197, 216, 224, 293–294, 302, 382/305
See application file for complete search history.

(56) References Cited

U.S. PATENT DOCUMENTS

| | | | |
|---|---|---|---|
| 2007/0217676 A1 | 9/2007 | Grauman | |
| 2009/0238460 A1 | 9/2009 | Funayama | |
| 2010/0027895 A1 | 2/2010 | Noguch | |
| 2010/0080469 A1 | 4/2010 | Liu et al. | |
| 2010/0135582 A1* | 6/2010 | Gokturk et al. | 382/195 |
| 2011/0116711 A1* | 5/2011 | Wang et al. | 382/165 |
| 2012/0321128 A1* | 12/2012 | Medioni et al. | 382/103 |

FOREIGN PATENT DOCUMENTS

| | | |
|---|---|---|
| KR | 100848034 B1 | 7/2008 |
| WO | 2010056399 A1 | 2/2010 |
| WO | 2010055399 A1 | 5/2010 |

OTHER PUBLICATIONS

Suri, Sahil and Schwind: Peter and Reinartz, Peter and Uhl, Johannes (Mar. 2009) Combining Mutual Information and Scale Invariant Feature Transform for Fast and Robust Multisensor SAR Image Registration. American Society of Photogrammetry and Remote Sensing, 75th Annual ASPRS Conference, Baltimore MD USA.
C. Harris and M. Stephens, "A combined corner and edge detector". In Alvey Vision Conference, pp. 147-151, 1988.
T. Lindeberg. "Feature detection with automatic scale selection". IJCV, 30(2):79-116, 1998.
D. G. Lowe. "Distinctive image features from scale-invariant keypoints". IJCV, 60(2):91-110, 2004.
K. Mikolajozyk and C. Schmid. "Scale and affine invariant interest point detectors". IJCV, 60(1):63-86, 2004.

(Continued)

*Primary Examiner* — Brian Le

(57) ABSTRACT

A local image patch identified in an image is divided into respective sub-patches of respective image forming elements. For each of the respective image forming elements in the local image patch, a respective ordinal rank of the image forming element is determined, and respective contributions of the image forming element to a particular one of the respective sub-patches containing the image forming element and to one or more other ones of the respective sub-patches neighboring the particular sub-patch are ascertained. Each ordinal rank corresponds to a respective dimension of an ordinal rank feature space. For each of the respective sub-patches of the local image patch, a respective histogram of ascertained contributions of the image forming elements in the ordinal rank feature space is built. A respective feature vector representing the local image patch is generated from the respective histograms built for the sub-patches of the local image.

20 Claims, 4 Drawing Sheets

(56) References Cited

OTHER PUBLICATIONS

S. Belongie, J. Malik, and J. Puzicha. "Shape matching and object recognition using shape contexts". IEEE Transactions on Pattern Analysis and Machine Intelligence, 24(4):509-522, 2002.

F. Tang, S. H. Lim. N. L. Chang, H. Tao. A novel feature descriptor invariant to complex brightness changes. CVPR 2009: 2631-2638.

J. Philbin, O. Chum, M. Isard, J. Sivic, A. Zisserman: Lost in quantization: Improving particular object retrieval in large scale image databases. CVPR 2008.

K. Mikolajczyk, C. Schmid, A performance evaluation of local descriptors. In PAMI 27(10):1615-1630, 2004.

K. Mikolajczyk and C Schmid, Scale and Affine invariant interest point detectors. In IJCV 60(1):63-86, 2004.

Feng Tang, SukHwan Lim and Nelson L. Chang, "An Improved Local Feature Descriptor Via Soft Binning" Image Processing, (ICIP), 2010 17th International Conference on , pp. 861-834, Sep. 26-29, 2010.

\* cited by examiner

ORDINAL AND SPATIAL LOCAL FEATURE VECTOR BASED IMAGE REPRESENTATION

BACKGROUND

Representing an image is a fundamental challenge in many image/video analysis and synthesis applications, such as three-dimensional modeling, motion tracking, correspondence matching, image recognition/categorization/retrieval and other applications in computer vision. Image representations can be categorized as global methods and local methods. For example, an image (as a whole) can be globally represented by global intensity histogram. However, such histograms are often not distinctive enough to characterize the appearance of the image. An example of a local method is image representation through sparse local features, which decomposes an image into multiple parts or patches, and the image is described as a constellation of these local features.

In image processing and analysis, a feature generally is a piece of information that is relevant for the particular processing or analysis task. A local feature typically has two components, a detector and a descriptor. The detector identifies features for further processing and analysis. Normally, the detector selects a small subset of highly distinctive pixels from the whole image. The descriptor characterizes the local image content of patches centered at the detected points using a feature vector. Thus, the feature detectors attempt to select stable and reliable image locations that are informative about image content and the descriptor describes the local patch in a distinctive way with a feature vector (usually a much lower dimension than the original patch). The overall usefulness of the local feature is affected by the reliability and accuracy of the detection (localization) and distinctiveness of the description.

Local feature based image representations are described herein.

DETAILED DESCRIPTION

Figure 1:
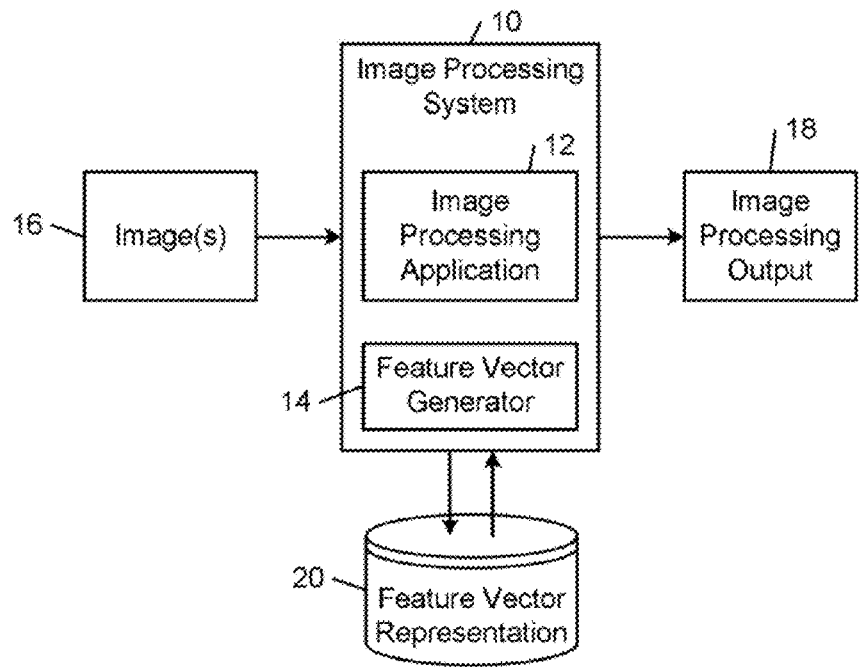
FIG. 1 is a block diagram of an example of an image processing system.

In the following description, like reference numbers are used to identify like elements. Furthermore, the drawings are intended to illustrate major features of examples in a diagrammatic manner. The drawings are not intended to depict every feature of actual examples nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The term "image forming element" refers to an addressable region of an image. In some examples, the image forming elements correspond to pixels, which are the smallest addressable units of an image. Each image forming element has at least one respective "image value" that is represented by one or more bits. For example, an image forming element in the RGB color space includes a respective image value for each of the colors red, green, and blue, where each of the image values may be represented by one or more bits.

An "image patch" (also referred to herein as an "interest region") refers to a local region of an image that is identified as having one or more targeted features or characteristics (e.g., intensity extrema, edge features, texture features, corner features, blobs, curvature features, and other salient features).

A "computer" is any machine, device, or apparatus that processes data according to computer-readable instructions that are stored on a computer-readable medium either temporarily or permanently. A "computer operating system" is a machine readable instructions component of a computer system that manages and coordinates the performance of tasks and the sharing of computing and hardware resources. A "software application" (machine readable instructions, also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information that is readable by a machine (e.g., a computer). Storage devices suitable for tangibly embodying these instructions and data include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "computer vision application" is an automated machine-implemented process that involves extracting information from an image and using the extracted information to solve a task (e.g., controlling processes, detecting events, organizing information, modeling objects or environments, and interacting with humans or machines).

As used herein, the term "includes" means includes but not limited to, the term "including" means including but not limited to. The term "based on" means based at least in part on.

The examples that are described herein provide a local feature descriptor for image representations that are robust to image changes including viewpoint changes, image blur, and JPEG compression. The local feature descriptor described herein may be used in a wide variety of image processing applications, including computer vision applications such as object recognition, near duplicate detection, camera calibration, robotic mapping and navigation, image stitching, three-dimensional modeling, gesture recognition, video tracking, and match moving (i.e., inserting computer graphics into live-action video).

FIG. 1 shows an example of an image processing system 10 that includes an image processing application 12 and a feature vector generator 14. In operation, the image processing system 10 processes one or more images 16 to produce an image processing output 18. In this process, the feature vector generator 14 generates a respective feature vector representation 20 of at least a portion of one of the one or more images 16, and the image processing application 12 uses the feature vector representation to produce the image processing output 18.

Figure 2:
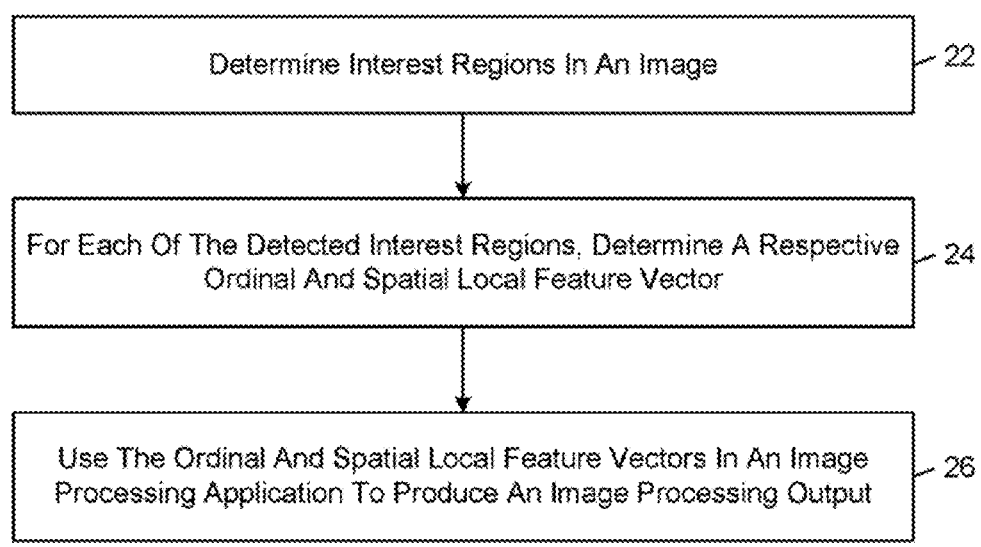
FIG. 2 is a flow diagram of an example of an image processing method.

FIG. 2 shows an example of a method by which the image processing system 10 processes the one or more images 16 to produce the image processing output 18.

In accordance with the example of FIG. 2, the image processing system 10 determines interest regions in the image (FIG. 2, block 22). In this process, the image processing system 10 applies one or more interest region detectors to each image 16 in order to detect interest regions in the image. Any of a wide variety of different interest region detectors may be used to detect interest regions in the reference and training images. In some examples, the interest region detectors are affine-invariant interest region detectors (e.g., Harris corner detectors, Hessian blob detectors, principal curvature based region detectors, and salient region detectors).

In, some examples, interest regions are localized at local intensity extrema (i.e., image forming elements where the derivative of the intensity surface is zero). In these examples, every image forming element in the image is examined to see if its intensity is an extremum (e.g., either an intensity maximum or minimum within some portion of the image). In this process, a window is centered at a candidate extremum point. In some examples, the window covers a square region of 3×3 or 5×5 image forming elements. The locations of pixel intensity extrema are invariant to any monotonic changes in brightness. In order to handle image noise, a pre-smoothing operation typically is performed before the extrema identification process.

For each of the detected interest regions, the image processing system 10 determines a respective region descriptor vector of region descriptor values characterizing the detected interest region (FIG. 2, block 24). In this process, the feature vector generator 14 applies an ordinal and spatial local feature descriptor to each of the detected interest regions in order to determine a respective ordinal and spatial local feature vector $\vec{V}_R = (d_{R1}, \ldots, d_{Rm})$ of ordinal and spatial local feature descriptor values characterizing the detected interest region, where $\vec{V}_R$ is the ordinal and spatial local feature vector for interest region R, and each $d_{Ri}$ represents a respective dimension i of the m-dimensional feature vector $\vec{V}_R$.

The image processing system 10 uses the ordinal and spatial local feature vectors in the image processing application 12 to produce the image processing output (FIG. 2, block 26). The image processing application 12 may be any type of automated machine-implemented process that involves using the extracted feature vector representation 20 to solve a task (e.g., controlling processes, detecting events, organizing information, modeling objects or environments, and interacting with humans or machines). Examples of such processes include object recognition, near duplicate detection, camera calibration, robotic mapping and navigation, image stitching, three-dimensional modeling, gesture recognition, video tracking, and match moving.

Figure 3:
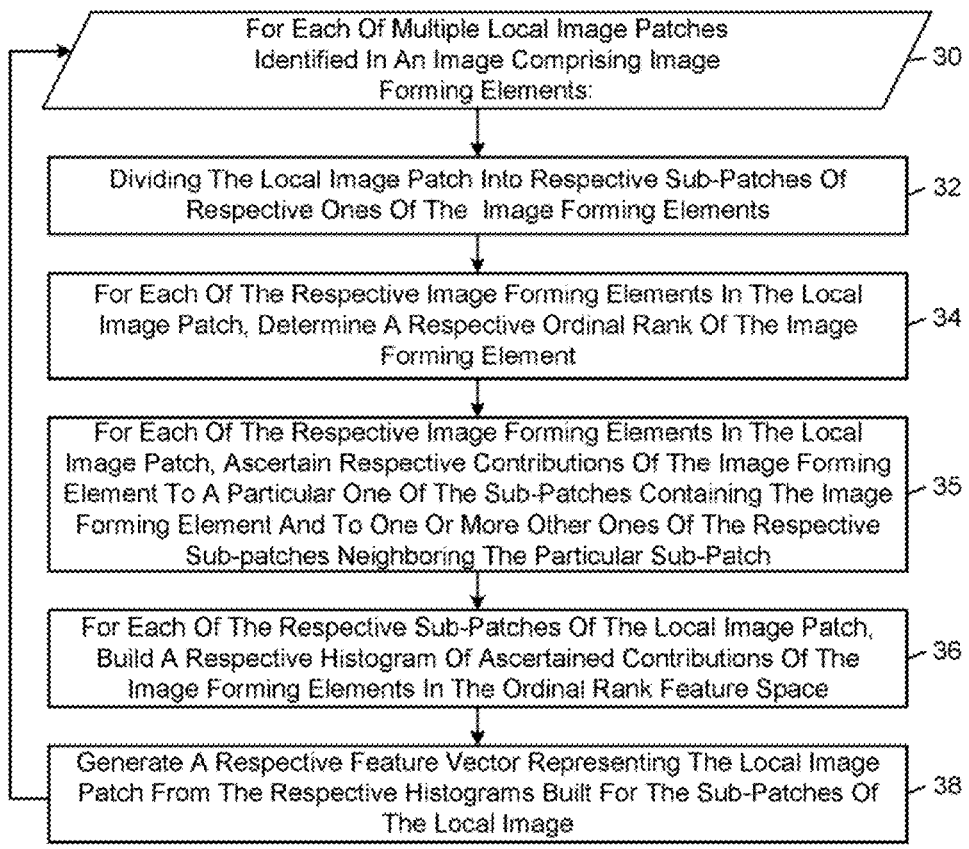
FIG. 3 is a flow diagram of an example of a method of generating a feature vector representation of at least a portion of an image.

FIG. 3 is a flow diagram of an example of a method by which the feature vector generator 14 generates a feature vector representation of an image. In accordance with this method, the feature vector generator 14 performs the following process for each of multiple local image patches that are identified in an image (FIG. 3, block 30). The feature vector generator 14 divides the local image patch spatially into respective sub-patches of respective ones of the image forming elements (FIG. 3, block 32). For each of the respective image forming elements in the local image patch, the feature vector generator 14 determines a respective ordinal rank of the image forming element, where each ordinal rank corresponds to a respective dimension of an ordinal rank feature space (FIG. 3, block 34). For each of the respective image forming elements in the local image patch, the feature vector generator 14 also ascertains respective contributions of the image forming element to a particular one of the respective sub-patches containing the image forming element and to one or more other ones of the respective sub-patches neighboring the particular sub-patch (FIG. 3, block 35). For each of the respective sub-patches of the local image patch, the feature vector generator 14 builds a respective histogram of ascertained contributions of the image forming elements in the ordinal rank feature space (FIG. 3, block 36). The feature vector generator 14 generates a respective feature vector representing the local image patch from the respective histograms built for the sub-patches of the local image (FIG. 3, block 38).

Figure 4A:
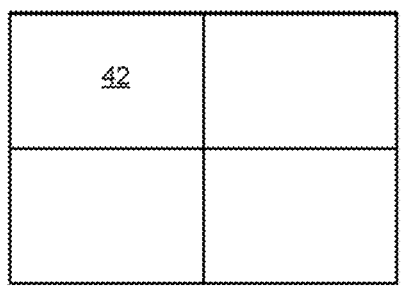
FIGS. 4A-4C are diagrammatic views of examples of local image patches that are divided into respective sub-patches.
Figure 4B:
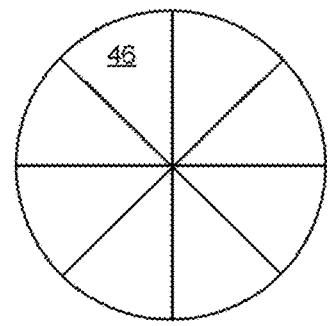
Figure 4C:
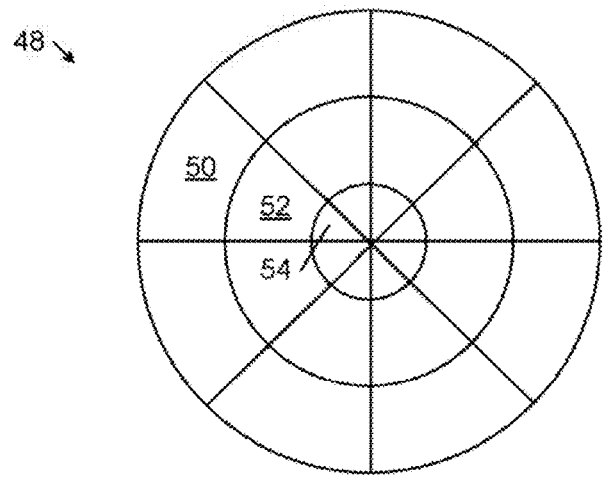

The feature vector generator 14 may divide the local image patch spatially into respective sub-patches of respective ones of the image forming elements in a variety of different ways (FIG. 3, block 32). First, the local image patches may have any of a variety of different shapes (e.g., regular shapes, irregular shapes, and arbitrary shapes). Second, the local image patches may be sub-divided in a variety of different ways. FIG. 4A shows an example, of a rectangular local image patch 40 that is divided into four rectangular sub-patches 42. FIG. 4B shows an example of a circular local image patch 44 that is divided into eight sector sub-patches 46. FIG. 4C shows an example of a circular local image patch 48 that is divided into eight sectors each of which is further sub-divided into three sub-patches 50, 52, 54.

For each of the respective image forming elements in the local image patch, the feature vector generator 14 may determine a respective ordinal rank of the image forming element in a variety of different ways (FIG. 3, block 34). In some examples, respective ordinal ranks are assigned to the image forming elements based on values of the image forming elements in the ordinal rank feature space and a quantization of the ordinal rank feature space into bins each of which is associated with a respective one of the ordinal ranks. In some examples, the ordinal rank feature space is an intensity feature space that is quantized into a number of bins each of which is associated with a respective rank (e.g., a bin number). In these examples, ordinal ranks are assigned to the image forming elements based on a mapping of intensity values of the image forming elements to the quantized intensity feature space. In some of these example, each bin has a predetermined number of image forming elements and the bins are ordered by rank, such that the intensities of all the image forming elements in a higher ranked bin(a) are greater than or equal to the intensities of all the image forming elements in a lower ranked bin(b) (i.e., a is greater than b). For example, if there are 400 image forming elements in a local image patch and the intensity feature space is quantized into five equal-sized bins, each bin will have 80 pixels and bin(i) will include image forming element intensities that are ranked in the range [(i−1)*80+1 : i*80]. In some examples, the image forming elements in the local image patch are ranked according to their respective brightness intensities before being grouped into the ordinal rank feature space bins and labeled with respective ordinal ranks.

Figure 5A:
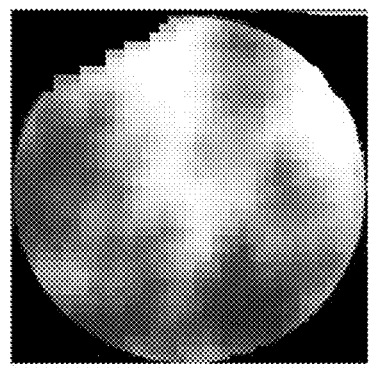
FIG. 5A shows an example of an image patch in an intensity feature space.
Figure 5B:
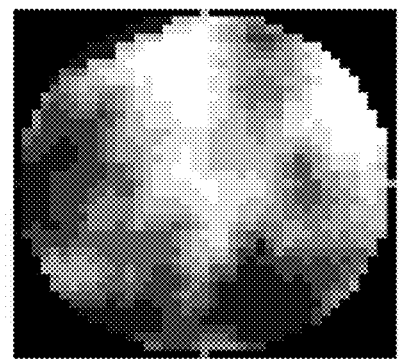
FIG. 5B shows an example of a quantization of the image patch of FIG. 5A into an ordinal rank feature space.
Figure 5C:
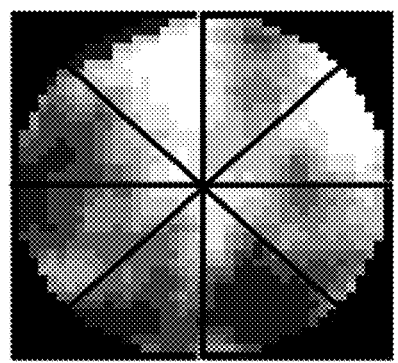
FIG. 5C shows an example of a spatial labeling of the transform of FIG. 5B.

FIGS. 5A-5C respectively show an example of an image patch 60 in an intensity feature space, an example of a quantization 62 of the image patch 60 into an ordinal rank feature space, and an example 64 of a spatial binning of the transform 62 into eight sector sub-patches.

For each of the respective image forming elements in the local image patch, the feature vector generator 14 may ascertain respective contributions of the image forming element to a particular one of the respective sub-patches containing the image forming element and to one or more other ones of the respective sub-patches neighboring the particular sub-patch in a variety of different ways (FIG. 3, block 35). In some examples, instead of assigning an image forming element to a single sub-patch (or "spatial bin"), it is assigned to several neighboring sub-patches according to a spatial weight map that allocates the respective contributions of the image forming element to the particular sub-patch and the other neighboring sub-patches. The weight map is defined by a weighting function that is centered at a respective location of the image forming element in the particular sub-patch. The weighting function defines an allocation of the contributions of the image forming element to the particular sub-patch and one or more other sub-patches that decreases monotonically with distance from the respective location. In some examples, for each image forming element (i,j), the contributions are determined by centering a respective weight map at that pixel, where the weight map has an extent that overlaps one or more neighboring sub-patches (or spatial bins). In some of these examples, the contribution of each image forming element (i,j) to each spatial bin is the sum of the contributions defined in the sub-region of the weight map that overlaps with the spatial bin.

Figure 6:
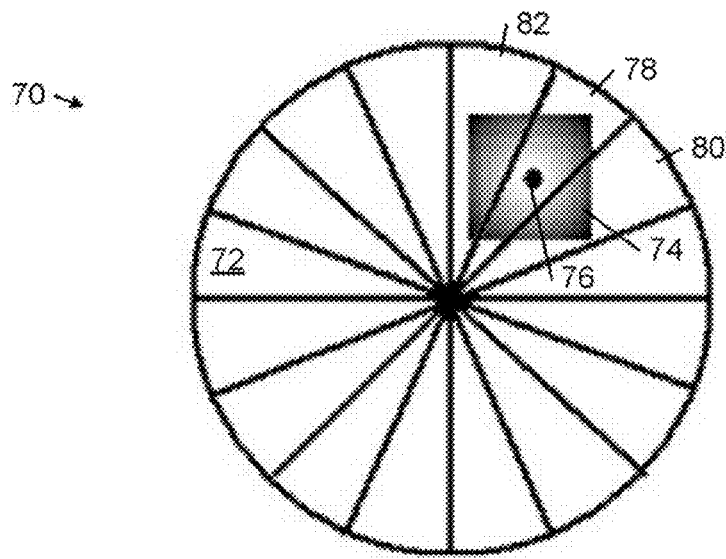
FIG. 6 shows an example of the contributions of an image forming element to multiple sub-patches into which a local image patch has been divided.

FIG. 6 shows an example of a local image patch 70 that is divided into sixteen sector sub-patches 72. An example of a weight map 74 is centered on a particular image forming element 76 that is located in a sector sub-patch 78. In the illustrated example, the weight map 74 overlaps the sector sub-patch 78 and the two neighboring sector sub-patches 80, 82. In this example, the image forming element 76 contributes a respective portion of its rank to the feature characterizations of all three sector sub-patches 78-82. Here the contribution amount is indicated by the grayscale value of the overlapping portion of the weight map 74, where lighter grayscale values indicate higher contributions and darker grayscale values indicate lower contributions.

As explained above, the weight map defines how much each image forming element contributes to each spatial bin. In some examples, the weight map assigns more weight to the spatial bins close to the contributing image forming element and less weight to the spatial bins further away from the contributing image forming element. In some of these examples, the weighting function is defined by a Gaussian weighting scheme. In these examples, (x,y) represents the image forming elements in the weight map, and the weight is each image forming element (W(x,y)) is computed by evaluating equation (1):

$$W(x, y) = \exp\left(-\frac{(x^2 + y^2)}{2\sigma^2}\right), \quad (1)$$

This weighting function is the same for all the pixels in the patch. The bigger the variance ($\sigma$) of the Gaussian the more tolerance the descriptor has for image deformations. In one example, the extent (or size) of the weighting function W is 10 image forming elements by 10 image forming elements and the variance ($\sigma$)) is 5 image forming elements.

For each of the respective sub-patches of the local image patch, the feature vector generator 14 may build a respective histogram of ascertained contributions of the image forming elements in the ordinal rank feature space in a variety of different ways (FIG. 3, block 36). In some examples, the weight map is defined in accordance with equation (1) and the spatial bins are denoted by $B=[B_1, B_2, \ldots, B_N]$, where each a corresponding to a respective spatial bin (or sub-patch). In these example, for a image forming element (i,j) in the sub-patch, a respective weight map W is placed at the location of the image forming element (i,j) (e.g., as shown in FIG. 6). For a given spatial bin $B_k$ that overlaps with the weight map, the contribution $C_{i,j}(k)$ of image forming element (i,j) to $B_k$ is computed by evaluating equation (2):

$$C_{i,j}(k) = \sum_{(x,y) \in B_k} W(x - i, y - j) \quad (2)$$

Equation (2) is evaluated for all the pixels in the patch, and the value of the spatial bin $B_k$ is computed as the sum of the contributions from all the image forming elements in the patch in accordance with equation (3):

$$B(k) = \sum_i \sum_j C_{i,j}(k). \quad (3)$$

The feature vector generator 14 may generate a respective feature vector representing the local image patch from the respective histograms built for the sub-patches of the local image patch in a variety of different ways (FIG. 3, block 38). In some examples, the feature vector representing a sub-patch SP of local image patch R is an k-dimensional vector $\vec{V}_{SP} = (d_{SP1}, \ldots, d_{SPk})$, where each $d_{SPi}$ represents the sum of contributions of the image forming elements in the sub-patch SP and the neighboring sub-patches that are assigned to the ordinal bin i in the quantized k-dimensional ordinal rank feature space.

In some examples, after the k-dimensional vectors are determined for each of the sub-patches of the local image patch, these k-dimensional vectors are concatenated to form an m-dimensional vector representing the descriptor of the local image patch, where m=N×k. The order of concatenation may follow a pre-determined order. For example, the concatenation may start from the horizontal sub-patch and traverse in a counter-clockwise order. If a combination angular/circular sub-patch division configuration is used such as that illustrated in FIG. 4C, then the order may follow an inside to outside path. In some examples, the feature vector may be normalized by the number of pixels in the local image patch to make the descriptor independent of the total number of pixels in the patch.

Examples of the image processing system 10 may be implemented by one or more discrete modules (or data processing components) that are not limited to any particular hardware, or machine readable instructions (e.g., firmware or software) configuration. In the illustrated examples, these modules may be implemented in any computing or data processing environment, including in digital electronic circuitry (e.g., an application-specific integrated circuit, such as a digital signal processor (DSP)) or in computer hardware, device driver, or machine readable instructions (including firmware or software). In some examples, the functionalities of the modules are combined into a single data processing component. In some examples, the respective functionalities of each of one or more of the modules are performed by a respective set of multiple data processing components.

The modules of the image processing system 10 may be co-located on a single apparatus or they may be distributed across multiple apparatus; if distributed across multiple apparatus, these modules and the display 24 may communicate with each other over local wired or wireless connections, or they may communicate over global network connections (e.g., communications over the Internet).

In some implementations, process instructions (e.g., machine-readable code, such as computer software) for implementing the methods that are executed by the examples of the image processing system 10, as well as the data they generate, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, examples of the variable document template generation system 10 may be implemented in any one of a wide variety of electronic devices, including desktop computers, workstation computers, and server computers.

Figure 7:
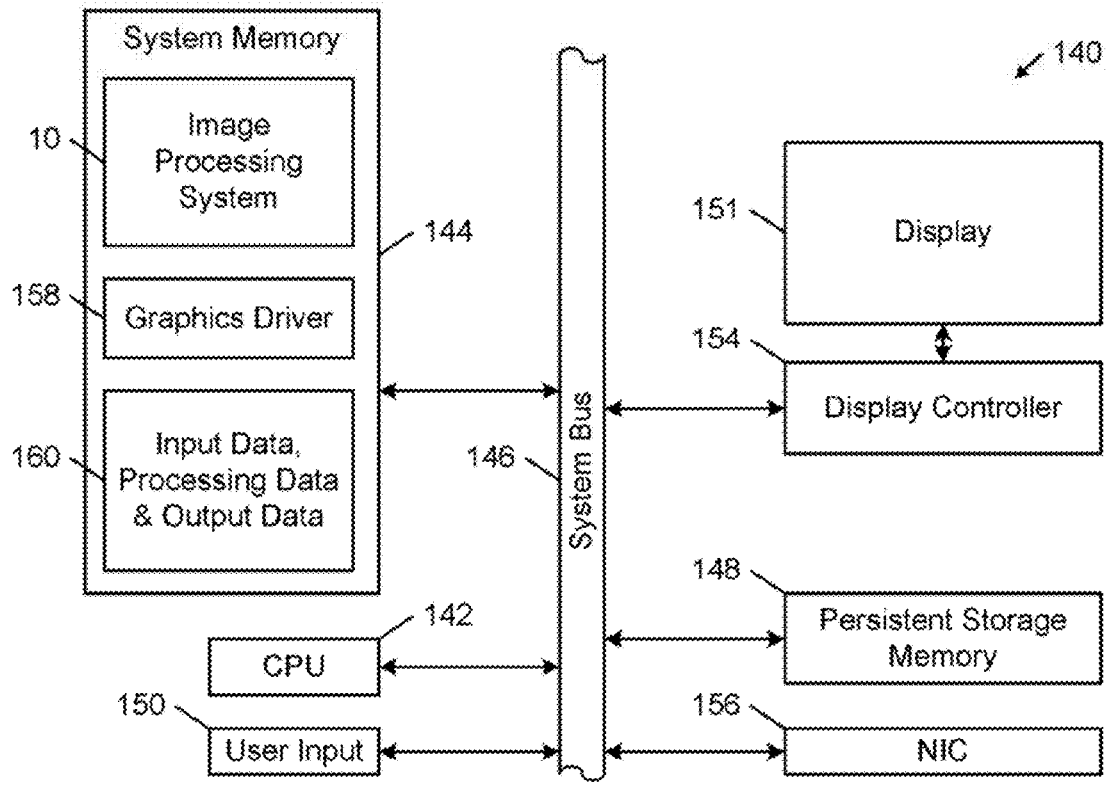
FIG. 7 shows an example of a computer system.

FIG. 7 shows an example of a computer system 140 that can implement any of the examples of the image processing system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (N IC) 156.

As shown in FIG. 7, the system memory 144 also stores the image processing system 10, a graphics driver 158, and processing information 160 that includes input data, processing data, and output data. In some examples, the image processing system 10 interfaces with the graphics driver 158 to present a user interface on the display 151 for managing and controlling the operation of the image processing system 10.

Other examples are within the scope of the claims.

The invention claimed is:

1. A method, comprising,
for each of multiple local image patches identified in an image comprising image forming elements:
dividing the local image patch into respective sub-patches of respective ones of the image forming elements;
for each of the respective image forming elements in the local image patch,
determining a respective ordinal rank of the image forming element, wherein each ordinal rank corresponds to a respective dimension of an ordinal rank feature space, and
ascertaining respective contributions of the image forming element to a particular one of the respective sub-patches containing the image forming element and to one or more other ones of the respective sub-patches neighboring the particular sub-patch;
for each of the respective sub-patches of the local image patch, building a respective histogram of ascertained contributions of the image forming elements in the ordinal rank feature space; and
generating a respective feature vector representing the local image patch from the respective histograms built for the sub-patches of the local image;
wherein the dividing, the determining, the ascertaining, the building, and the generating are performed by a processor.

2. The method of claim 1, wherein the determining comprises assigning the respective ordinal ranks to the image forming elements based on values of the image forming elements in the ordinal rank feature space and a quantization of the ordinal rank feature space into bins each of which is associated with a respective one of the ordinal ranks.

3. The method of claim 2, wherein the ordinal rank feature space is a quantized intensity feature space, and the assigning comprises assigning the respective ordinal ranks to the image forming elements based on a mapping of intensity values of the image forming elements to the quantized intensity feature space.

4. The method of claim 1, wherein the ascertaining comprises, for each of the respective image forming elements in the local image patch, determining a spatial weight map that allocates the respective contributions of the image forming element to the particular sub-patch and the other neighboring sub-patches.

5. The method of claim 4, wherein the determining of the spatial weight map comprises evaluating a weighting function that is centered at a respective location of the image forming element in the particular sub-patch and defines an allocation of the contributions of the image forming element to the particular sub-patch and one or more other sub-patches that decreases monotonically with distance from the respective location.

6. The method of claim 5, wherein the weighting function is a Gaussian function of position in the image relative to the respective location of the image forming element in the image.

7. The method of claim 1, wherein, for each of the respective sub-patches of the local image patch, the building comprises summing the respective contributions of the image forming elements to the respective sub-patch by determined ordinal rank.

8. The method of claim 1, further comprising identifying the local image patches in the image, wherein the identifying comprises applying a local feature detector to the image.

9. The method of claim 8, wherein the local image patches are circular and the dividing comprises dividing each of the circular image patches into a respective set of sectors.

10. The method of claim 1, further comprising using the feature vectors in an image processing application.

11. Apparatus, comprising:
a memory storing processor-readable instructions; and
a processor coupled to the memory, operable to execute the instructions, and based at least in part on the execution of the instructions operable to perform operations comprising
for each of multiple local image patches identified in an image comprising image forming elements:
dividing the local image patch into respective sub-patches of respective ones of the image forming elements;
for each of the respective image forming elements in the local image patch,
determining a respective ordinal rank of the image forming element, wherein each ordinal rank corresponds to a respective dimension of an ordinal rank feature space, and
ascertaining respective contributions of the image forming element to a particular one of the respective sub-patches containing the image forming element and to one or more other ones of the respective sub-patches neighboring the particular sub-patch;
for each of the respective sub-patches of the local image patch, building a respective histogram of ascertained contributions of the image forming elements in the ordinal rank feature space; and
generating a respective feature vector representing the local image patch from the respective histograms built for the sub-patches of the local image.

12. The apparatus of claim 11, wherein in the determining the processor is operable to perform operations comprising assigning the respective ordinal ranks to the image forming elements based on values of the image forming elements in the ordinal rank feature space and a quantization of the ordinal rank feature space into bins each of which is associated with a respective one of the ordinal ranks.

13. The apparatus of claim 11, wherein in the ascertaining the processor is operable to perform operations comprising, for each of the respective image forming elements in the local image patch, determining a spatial weight map that allocates the respective contributions of the image forming element to the particular sub-patch and the other neighboring sub-patches.

14. The apparatus of claim 13, wherein in the determining of the spatial weight map the processor is operable to perform operations comprising evaluating a weighting function that is centered at a respective location of the image forming element in the particular sub-patch and defines an allocation of the contributions of the image forming element to the particular sub-patch and one or more other sub-patches that decreases monotonically with distance from the respective location.

15. The apparatus of claim 11, wherein in the building the processor is operable to perform operations comprising, for each of the respective sub-patches of the local image patch, summing the respective contributions of the image forming elements to the respective sub-patch by determined ordinal rank.

16. At least one non-transitory computer-readable medium having processor-readable program code embodied therein, the computer-readable program code adapted to be executed by a computer to perform operations comprising:
for each of multiple local image patches identified in an image comprising image forming elements:
dividing the local image patch into respective sub-patches of respective ones of the image forming elements;
for each of the respective image forming elements in the local image patch,
determining a respective ordinal rank of the image forming element, wherein each ordinal rank corresponds to a respective dimension of an ordinal rank feature space, and
ascertaining respective contributions of the image forming element to a particular one of the respective sub-patches containing the image forming element and to one or more other ones of the respective sub-patches neighboring the particular sub-patch;
for each of the respective sub-patches of the local image patch, building a respective histogram of ascertained contributions of the image forming elements in the ordinal rank feature space; and
generating a respective feature vector representing the local image patch from the respective histograms built for the sub-patches of the local image.

17. The computer-readable medium of claim 16, wherein the determining comprises assigning the respective ordinal ranks to the image forming elements based on values of the image forming elements in the ordinal rank feature space and a quantization of the ordinal rank feature space into bins each of which is associated with a respective one of the ordinal ranks.

18. The computer-readable medium of claim 16, wherein the ascertaining comprises, for each of the respective image forming elements in the local image patch, determining a spatial weight map that allocates the respective contributions of the image forming element to the particular sub-patch and the other neighboring sub-patches.

19. The computer-readable medium of claim 18, wherein the determining of the spatial weight map comprises evaluating a weighting function that is centered at a respective location of the image forming element in the particular sub-patch and defines an allocation of the contributions of the image forming element to the particular sub-patch and one or more other sub-patches that decreases monotonically with distance from the respective location.

20. The computer-readable medium of claim 16, wherein, for each of the respective sub-patches of the local image patch, the building comprises summing the respective contributions of the image forming elements to the respective sub-patch by determined ordinal rank.

* * * * *